(12) United States Patent
Skeels (10) Patent No.: US 10,344,550 B2
(45) Date of Patent: Jul. 9, 2019

(54) SYSTEMS FOR REVERSING FLUID FLOW TO AND FROM A SINGLE-DIRECTION FLUID FLOW DEVICE

(71) Applicant: FMC TECHNOLOGIES, INC., Houston, TX (US)

(72) Inventor: Harold Brian Skeels, Kingwood, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 15/770,613

(22) PCT Filed: Jul. 25, 2016

(86) PCT No.: PCT/US2016/043805
§ 371 (c)(1),
(2) Date: Apr. 24, 2018

(87) PCT Pub. No.: WO2018/021992
PCT Pub. Date: Feb. 1, 2018

(65) Prior Publication Data
US 2018/0313181 A1    Nov. 1, 2018

(51) Int. Cl.
*E21B 33/035* (2006.01)
*E21B 33/068* (2006.01)
(Continued)

(52) U.S. Cl.
CPC .......... *E21B 33/0355* (2013.01); *E21B 37/06* (2013.01); *E21B 41/0007* (2013.01); *F16K 27/0263* (2013.01)

(58) Field of Classification Search
CPC .. E21B 33/0355; E21B 33/068; E21B 33/076; E21B 37/06; E21B 41/0007
See application file for complete search history.

(56) References Cited

U.S. PATENT DOCUMENTS 3,608,631 A * 9/1971 Sizer .................. E21B 23/08
                                                138/45
8,500,431 B2 * 8/2013 Reneker .................. D01D 1/09
                                                425/174.8 E (Continued)

FOREIGN PATENT DOCUMENTS

WO    2007003597 A1    1/2007
WO    2011039514 A2    4/2011
WO    2014031123 A1    2/2014

OTHER PUBLICATIONS

International Search Report and Written Opinion dated Apr. 25, 2017 for PCT/US2016/043805, filed on Jul. 25, 2016.

*Primary Examiner* — Matthew R Buck
(74) *Attorney, Agent, or Firm* — Amerson Law Firm, PLLC (57) ABSTRACT

Disclosed is flow reversal system (100) that comprises a single direction flow device (101) adapted for receiving a fluid and first (120), second (122), third (124) and fourth (126) binary valves. The system is adapted to be configured in a first position wherein the first (120) and fourth (126) binary valves are open and the second (122) and third (124) binary valves are closed and the fluid flows through the single direction flow device (101) in a first direction (103), be configured from the first position to a neutral position by actuating the second (122) and third (124) binary valves from a closed position to an open position wherein, in the neutral position, the first (120), second (122), third (124) and fourth (126) binary valves are open and the fluid flows through the single direction flow device (101) in the first direction (103) and be configured from the neutral position to a second position by actuating the first (120) and fourth (126) binary valves from an open position to a closed position wherein the first (120) and fourth (126) binary valves are closed and the second (122) and third (124) binary (Continued)

valves are opened and the fluid flows through the single direction flow device (101) in the first direction (103).

21 Claims, 10 Drawing Sheets

(51) Int. Cl.
*E21B 33/076* (2006.01)
*E21B 37/06* (2006.01)
*E21B 41/00* (2006.01)
*F16K 27/02* (2006.01)

(56) References Cited

U.S. PATENT DOCUMENTS 9,169,714 B2 * 10/2015 Edwards ............. E21B 41/0007
9,482,075 B2 * 11/2016 Smedstad ........... E21B 41/0007

* cited by examiner

(Prior Art)

Figure 2B

(Prior Art)

SYSTEMS FOR REVERSING FLUID FLOW TO AND FROM A SINGLE-DIRECTION FLUID FLOW DEVICE

FIELD OF INVENTION

The presently disclosed inventions generally relate to a system for reversing fluid flow to and from various single-flow direction devices, such as, for example, a pump, a flow meter, a metering valve, a choke, etc. The presently disclosed inventions have wide applicability and may be employed in a variety of different situations and environments. In one illustrative example, the systems disclosed herein may be employed in systems and equipment positioned subsea that are used in drilling and/or producing hydrocarbons (oil and/or gas) from subsea oil/gas wells.

BACKGROUND OF THE INVENTION

Production of hydrocarbons (oil and/or gas) from subsea oil/gas wells typically involves positioning several items of production equipment, e.g., Christmas trees, manifolds, pipelines, flowline skids, pipeline end terminations (PLETs), etc. on the sea floor. Flowlines or jumpers are normally coupled to these various items of equipment so as to allow the produced hydrocarbons to flow between and among such production equipment with the ultimate objective being to get the produced hydrocarbon fluids to a desired end-point, e.g., a surface vessel or structure, an on-shore storage facility or pipeline, etc. Jumpers may be used to connect the individual wellheads to a central manifold. In other cases, relatively flexible lines may be employed to connect some of the subsea equipment items to one another. The generic term "flowline" will be used throughout this application to refer to any type of line through which hydrocarbon-containing fluids can be produced from a subsea well.

One challenge facing offshore oil and gas operations involves insuring the flowlines and fluid flow paths within subsea equipment remain open so that production fluid may continue to be produced. The produced hydrocarbon fluids will typically comprise a mixture of crude oil, water, light hydrocarbon gases (such as methane), and other gases such as hydrogen sulfide and carbon dioxide. In some instances, solid materials or debris, such as sand, small rocks, pipe scale or rust, etc., may be mixed with the production fluid as it leaves the well. The same challenge applies to other subsea flowlines and fluid flow paths used for activities related to the production of hydrocarbons. These other flowlines and flow paths could be used to, for example, service the subsea production system (service lines), for injecting water, gas or other mixture of fluids into subsea wells (injection lines) or for transporting other fluids, including control fluids (control lines).

One problem that is sometimes encountered in the production of hydrocarbon fluids from subsea wells is that a blockage may form in a subsea flowline or in a piece of subsea equipment. In some cases the blockage can completely block the flowline/equipment while in other cases the blockage may only partially block the flowline/equipment. For example, the solid materials entrained in the produced fluids may be deposited during temporary production shut-downs, and the entrained debris may settle so as to form all or part of a blockage in a flowline or item of production equipment. Another problem that may be encountered is the formation of hydrate blockages in the flowlines and production equipment.

In general, hydrates may form under appropriate high pressure and low temperature conditions. As a general rule of thumb, hydrates may form at a pressure greater than about 0.47 MPa (about 1000 psi) and a temperature of less than about 21° C. (about 70° F.), although these numbers may vary depending upon the particular application and the composition of the production fluid. Subsea oil and gas wells that are located at water depths greater than a few hundred feet or located in cold weather environments, are typically exposed to water that is at a temperature of less than about 21° C. (about 70° F.) and, in some situations, the surrounding water may only be a few degrees above freezing. Although the produced hydrocarbon fluid is relatively hot as it initially leaves the wellhead, as it flows through the subsea production equipment and flowlines, the surrounding water will cool the produced fluid. More specifically, the produced hydrocarbon fluids will cool rapidly when the flow is interrupted for any length of time, such as by a temporary production shut-down. If the production fluid is allowed to cool to below the hydrate formation temperature for the production fluid and the pressure is above the hydrate formation pressure for the production fluid, hydrates may form in the produced fluid which, in turn, may ultimately form a blockage which may block the production fluid flow paths through the production flowlines and/or production equipment. Of course, the precise conditions for the formation of hydrates, e.g., the right combination of low temperature and high pressure is a function of, among other things, the gas-to-water composition in the production fluid which may vary from well to well. When such a blockage forms in a flowline or in a piece of production equipment, either a hydrate blockage or a debris blockage or a combination of both, it must be removed so that normal production activities may be resumed.

Figure 1A:
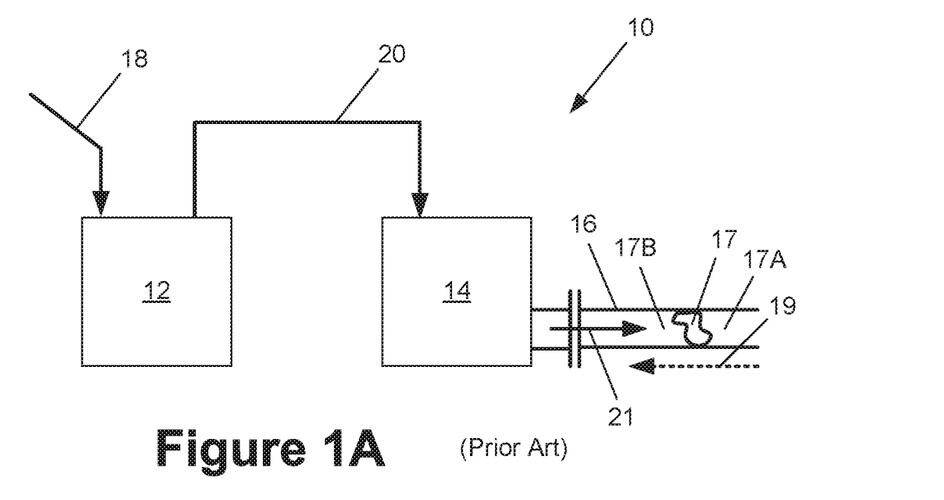
FIGS. 1A-1B depict one illustrative prior art system that may be employed to remove blockages, e.g., hydrate plugs, debris plugs, etc., from subsea flowlines and subsea equipment.
Figure 1B:
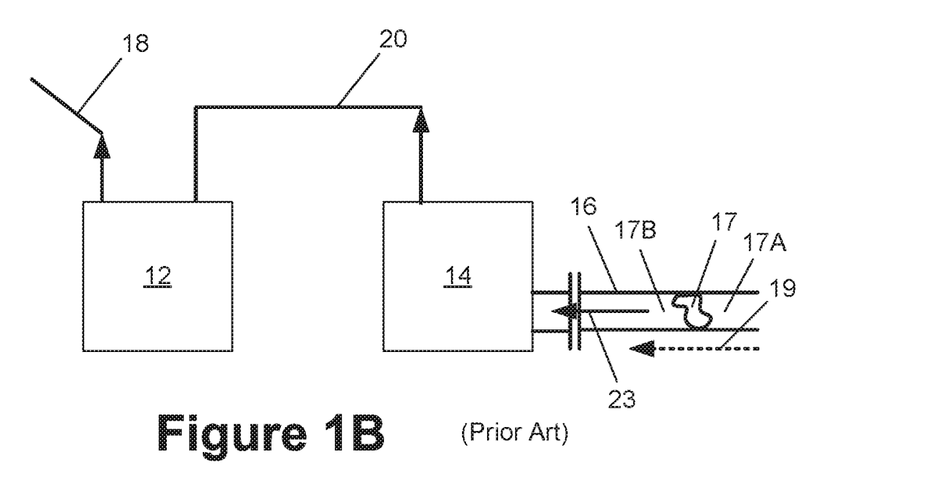

FIGS. 1A-1B simplistically depicts one illustrative prior art system 10 and method that has been employed for removing such a blockage from subsea flowlines/equipment. The system 10 comprises a pump module 12, an isolation valve module 12, a subsea flow line 16 and a simplistically depicted blockage 17 positioned in the flow line 16. Also depicted are a downline 18 and a connecting line 20 between the pump module 12 and the isolation valve module 20. Various fluids may be supplied to the system 10 from a surface vessel or platform (not shown) via the downline 18 and, in practice; there may be multiple downlines 18 that are connected to the system 10 as well as multiple lines 20.

Fluid flow in the flow line 16 would normally flow in the direction indicated by the dashed line arrow 19 when the flow line 16 is operational. Once the blockage 17 was detected and its location identified, the system 10 was lowered to the sea floor and coupled to the flow line 16. As depicted, the blockage 17 has an upstream side 17A and a downstream side 17B. To successfully remove blockages and hydrates from pipelines and large volume pressure vessels, the most common methodology is to first inject chemicals to the affected area (in an attempt to chemically dissolve or soften the blockage 17), followed by a repeatedly creating a differential pressure across the blockage 17. Creating the differential pressure across the blockage 17 often involved creating a vacuum or low pressure on one side of the blockage and/or reversing fluid flow in the flow line 16. For example, a first operation would be performed to create a differential pressure across the blockage 17 with the higher pressure being on the downstream side 17B of the blockage 17. Then, a second operation would be performed so as to create a differential pressure across the blockage 17 with the higher pressure being on the upstream side 17A of the blockage 17. Such operations were performed so as to generate alternating "push" and "pull" forces on the blockage 17 in an attempt to mechanically dislodge the blockage 17. Such "push-pull" operations were typically repeated several times to create a back-and-forth mechanical cyclic force to help dislodge the blockage 17.

The pump module 12 comprises one or more pumps (not individually shown) that is adapted to receive chemicals and/or fluids from the surface via the downline 18. As shown in FIG. 1A, the pump module 12 is adapted to be configured and controlled so as to inject those chemicals and/or fluids through the isolation valve module 14 and into the flow line 16 on the downstream side 17B of the blockage 17 as indicated by the arrow 21. The isolation valve module 14 contains a safety shut-in valve to insure safe operations. As shown in FIG. 1B, the pump module 12 is also adapted to be configured and controlled so as to create a relatively low pressure or vacuum on the downstream side 17B of the blockage 17 by pulling fluid from the downstream side 17B of the blockage and pumping the fluid to the surface via the downline 18.

In one particular example, the blockage removal method may involve first injecting chemicals into an area on the upstream side 17A of the blockage 17 in an attempt to chemically dissolve or soften the blockage 17. Thereafter, efforts are undertaken to reduce the pressure on the downstream side 17B of the blockage 17. The area of low pressure serves at least two purposes. First, by exposing the blockage 17, in this case a hydrate blockage, to a lower pressure on its downstream side 17B that is less than the hydrate formation pressure, all or a part of the blockage 17 may essentially "melt" away (via sublimation). Second, the pressure on the downstream side 17B of the blockage 17 may be reduced in an attempt to create a differential pressure across the blockage 17 (with higher pressure being present on the upstream side 17A of the blockage 17) so as to force the production fluid in the flow line 16, with portions of the removed blockage 17 entrained therein to flow in the direction indicated by the arrow 23, i.e., through the pump module 12 and to the surface via the downline 18. As noted above, in performing such operations, the direction of fluid flow to and from the pump module 12 may need to be reversed several times. This is accomplished by various valves positioned in the pump module 12 that are switched from open/close to reverse flow from the isolation valve module 14 to create a vacuum or relatively low pressure on the downstream side 17B of the blockage 17.

Figure 1C:
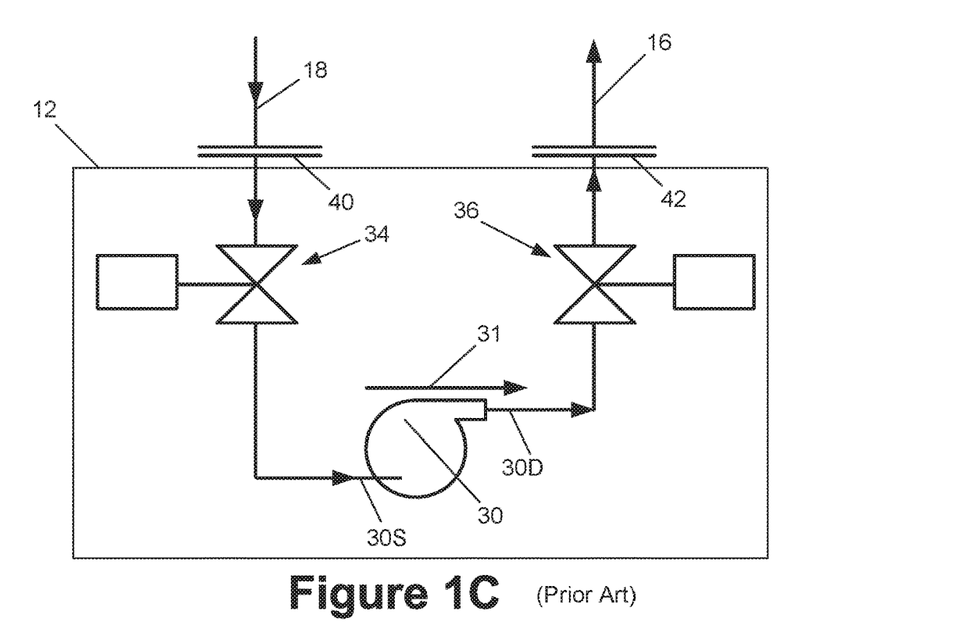
FIGS. 1C-1D depict one illustrative prior art pump module that may be employed to remove blockages, e.g., hydrate plugs, debris plugs, etc., from subsea flowlines and subsea equipment.
Figure 1D:
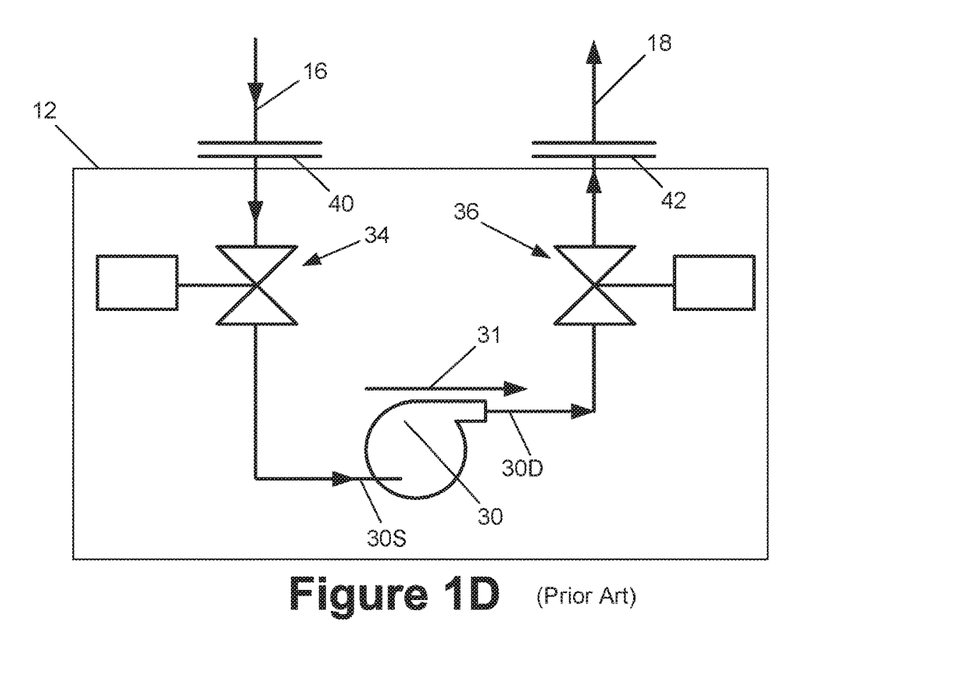

On illustrative example of a prior art pump module 12 that may be employed in connection with removing the blockage from a flow line 16 is depicted in FIGS. 1C-1D. As shown therein, the illustrative pump module 12 is comprised of a pump 30, an inlet 40, and outlet 42, an inlet valve 34 and an outlet valve 36. The inlet valve 34 controls the flow of fluid to the suction side 30S of the pump 30 while the outlet valve 36 controls the flow of fluid from the discharge side 30D of the pump 30. Fluid flows through the pump 30 in the direction indicated by the arrow 31. As shown in FIG. 1C, in one illustrative embodiment, in attempting to remove a blockage from the flow line 16, the pump module 12 may be positioned subsea, and the flow line 16 may be initially coupled to the outlet 42 of the pump module 12 while a down line 18 from a vessel may be initially coupled to the inlet 40 of the pump module 12. Fluids, such as a chemical solution, and increased pressure may be supplied to the downstream side 17B of the blockage 17 by injecting a fluid into the flow line 16. As shown in FIG. 1D, to "reverse" the fluid flow through the flow line 16, the flow line 16 may be decoupled from the outlet 42 of the pump module 12 and coupled to the inlet 40 of the pump module 40, while the down line 18 may be disconnected from the inlet 40 of the pump module 12 and coupled to the outlet 42 of the pump module 12. By disconnecting and recoupling the lines 16, 18 to the inlet 42, outlet 44 of the pump module 12, the flow of the fluid to/from the flow line 16 may be reversed. However, the decoupling and coupling of such flow lines 16 and down lines 18 can be time consuming and expensive and may result in other problems such as damaged seal interfaces due to coupling and decoupling various lines to the pump module 12.

Figure 2A:
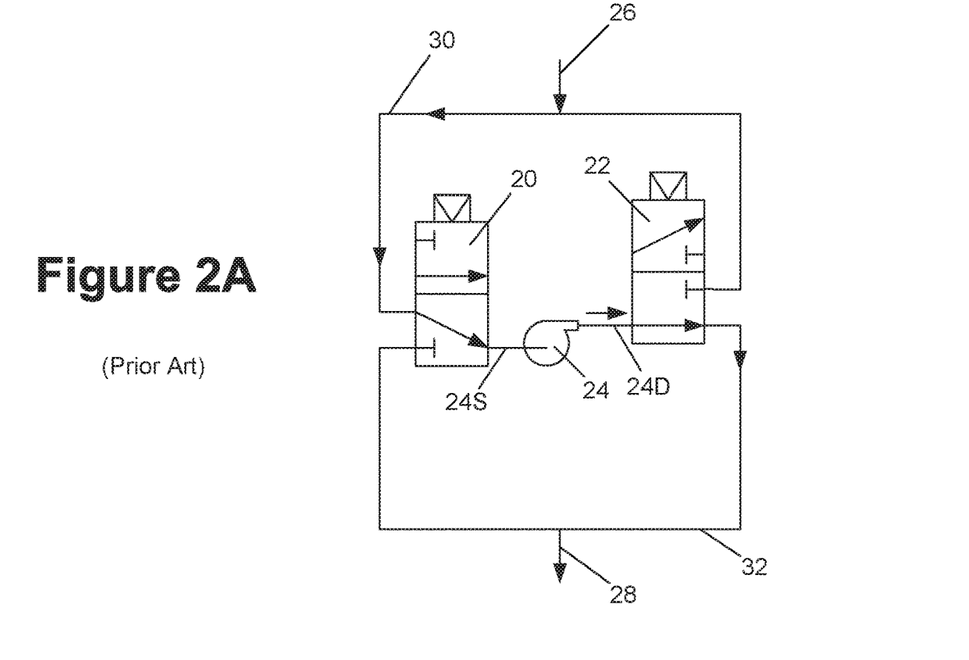
FIGS. 2A-2B depicts one illustrative prior art system comprised of a plurality of two-position tree-way valves for reversing fluid flow from a system comprising a pump.
Figure 2B:
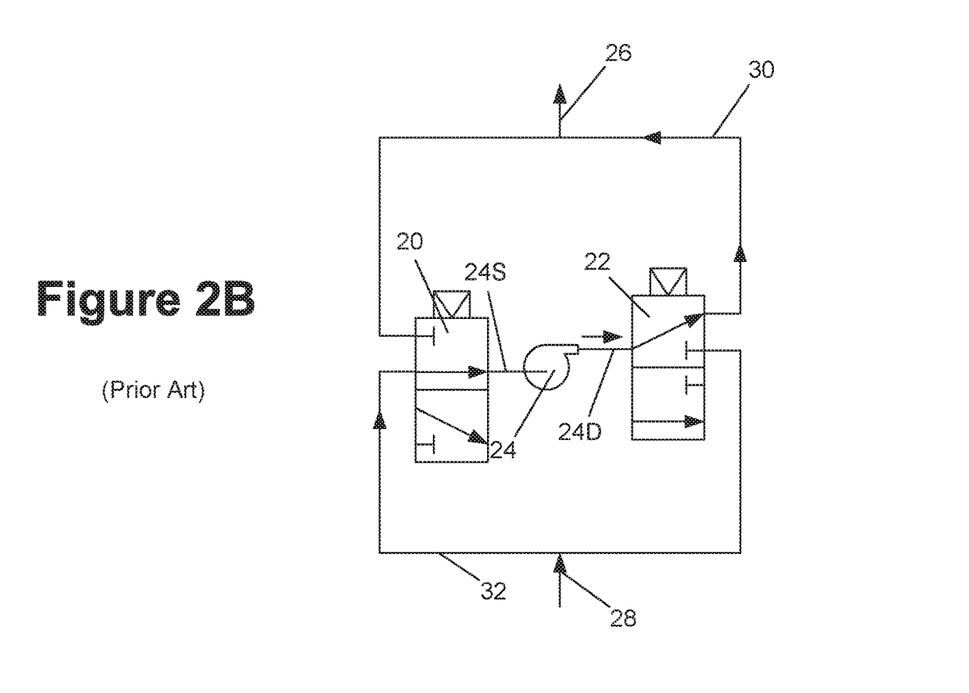

With reference to FIGS. 2A-2B, in smaller scale applications flow reversal to a device such as a pump 24 may be accomplished by the use of two three-way valves 20, 22. In FIG. 2A, the valves 20, 22 are in a first position wherein fluid flow enters the system via line 26 flows to the valve 20 via line 30 where it is directed to the suction side 24S of the pump 24. Fluid flow from the discharge side 24D of the pump 24 flows through the valve 22 and enters line 32 where it ultimately exits the system via line 28. In FIG. 2B, the valves 20, 22 are actuated to a second position wherein fluid flow enters the system via line 28 flows to the valve 20 via line 32 where it is directed to the suction side 24S of the pump 24. Fluid flow from the discharge side 24D of the pump 24 flows through the valve 22 and enters line 30 where it ultimately exits the system via line 26.

The present application is directed to various systems, methods and devices useful in reversing fluid flow to and from various single-flow direction devices that may eliminate or at least minimize some of the problems noted above.

BRIEF DESCRIPTION OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment, the present application is generally directed to various systems, methods and devices useful in reversing fluid flow to and from various single-flow direction devices. In one illustrative embodiment, the system includes, among other things, a single direction flow device that is adapted for receiving a fluid and first, second, third and fourth binary valves. The system is adapted to be configured in a first position wherein the first and fourth binary valves are open and the second and third binary valves are closed and the fluid flows through the single direction flow device in a first direction, be configured from the first position to a neutral position by actuating the second and third binary valves from a closed position to an open position wherein, in the neutral position, the first, second, third and fourth binary valves are open and the fluid flows through the single direction flow device in the first direction and be configured from the neutral position to a second position by actuating the first and fourth binary valves from an open position to a closed position wherein the first and fourth binary valves are closed and the second and third binary valves are opened and the fluid flows through the single direction flow device in the first direction.

BRIEF DESCRIPTION OF THE DRAWINGS

The present invention will be described with the accompanying drawings, which represent a schematic but not limiting its scope.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIGS. 3A-3G depicts various novel systems 100 for reversing fluid flow to and from various single-flow direction devices 101 and methods of using and operating such a system in various illustrative applications. As described more fully below, the systems 100 include various novel devices and such systems enable the performance of various novel methods. In one illustrative example, at least one embodiment of the systems 100 disclosed herein may be employed to remove blockages from subsea flowlines and equipment.

Figure 3A:
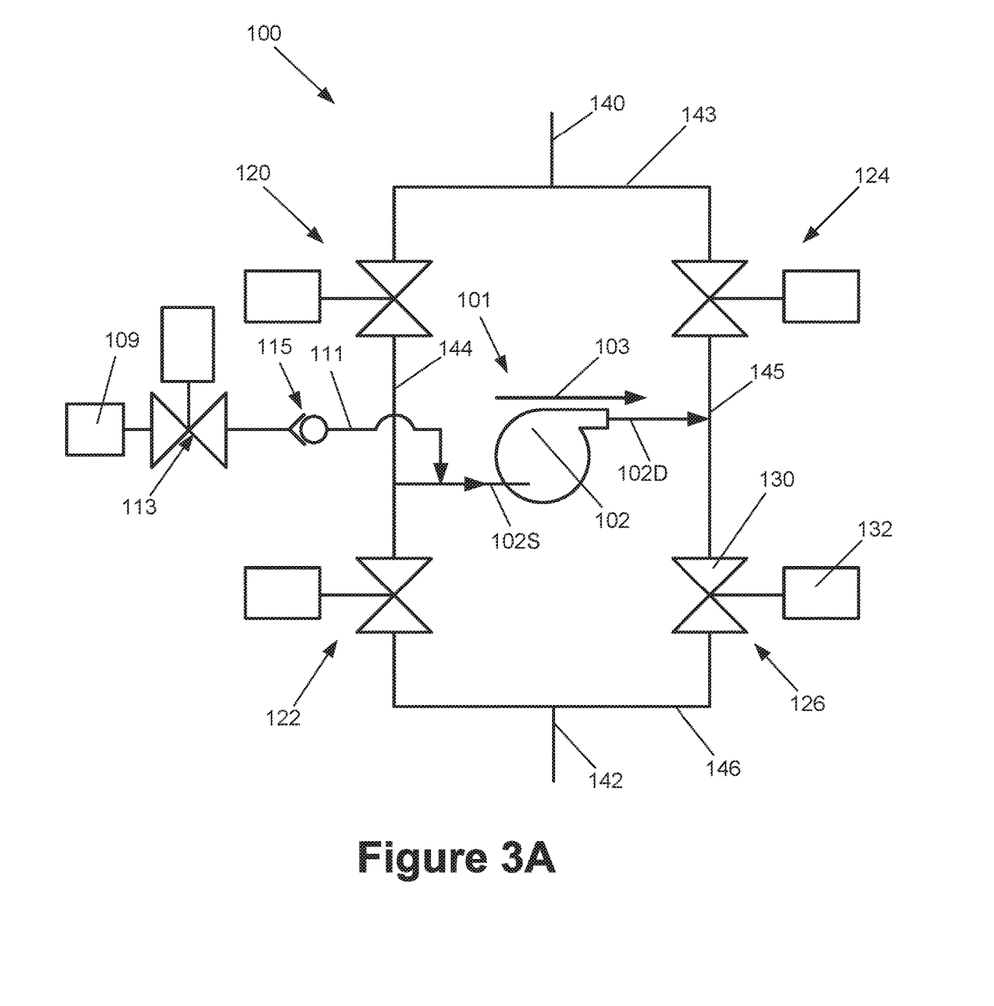
FIGS. 3A-3G depicts various embodiments of a novel system for reversing fluid flow to and from various single-flow direction devices and methods of using and operating such a system in various illustrative applications.

FIG. 3A depicts one illustrative embodiment of a novel flow reversal system 100 disclosed herein that, in one illustrative application, may be used to remove a blockage (not shown) from an item of equipment or a flow line. In general, the system 100 comprises a single direction flow device 101, four on-off type (i.e., binary) valves 120, 122, 124 and 126 and a plurality of fluid flow lines 140, 142, 143, 144, 145 and 146. The single direction flow device 101 may any of a variety of different type devices or components wherein fluid flow through the device 101 in normal operations occurs in a single direction 103. In the example depicted in FIG. 3A, the single direction flow device 101 takes the form of an illustrative pump 102 with a suction side 120S and a discharge side 102D. In the example depicted in FIG. 3C, the single direction flow device 101 takes the form of an illustrative flow meter 140 (e.g., a venturi type flow meter is depicted) with an inlet 140A and an outlet 140B. In the example depicted in FIG. 3D, the single direction flow device 101 takes the form of an illustrative adjustable choke 150 with an inlet 150A and an outlet 150B. In a further enhanced system 100, and with reference to FIG. 3A, ethanol (MeOH) form a source 109 (e.g., a surface vessel, an ROV, a storage vessel, etc.) may be supplied to the suction side 102S of the pump 102 via an injection line 111 with a gate or ball valve 113 and a check valve 115 positioned therein. The ethanol may be introduced into the system 100 to ward off hydrate or cavitation formation on the suction side 102S of the pump 102 (or inlet side of the other types of single direction flow devices 101) when the system 100 is used in cold or subsea environments.

With continuing reference to FIG. 3A, in the depicted example, each of the binary valves 120, 122, 124 and 126 comprises a valve element 130 and a valve actuator 132. The system comprises a first inlet/outlet line 140 and a second inlet/outlet line 142, both of which may be placed in fluid communication with the inlet or outlet of the single direction flow device 101 depending upon the open/closed status of the binary valves 120, 122, 124 and 126 as described more fully below. As depicted, the first 120 and second 122 binary valves are positioned and adapted to regulate the supply of the fluid to the inlet of the single direction flow device 101, while the third 124 and fourth 126 binary valves are positioned and adapted to regulate the flow of the fluid from the outlet of the single direction flow device 101. In one illustrative arrangement, certain valves may be opened and certain valves may be closed such that the system 100 is configured in a first position wherein the fluid enters the system via the first inlet/outlet line 140 flows through the single direction flow device 101 in the first direction 103 and leaves the system via the second inlet/outlet line 142. Additionally, the overall direction of the flow of fluid through the system 100 may be reversed by opening certain valves and closing certain valves such that the system is configured in a second position wherein the fluid enters the system via the second inlet/outlet line 142 flows through the single direction flow device 101 in the first direction 103 and leaves the system via the first inlet/outlet line 140. These various configurations are discussed more fully below.

In one illustrative example, the binary valves 120, 122, 124 and 126 may be gate valves or ball valves or a combination of such valves that are positioned in or in fluid communications with illustrative the fluid flow lines 143, 144, 145 and 146 as shown in FIG. 3A relative to the position of the single direction flow device 101. In some applications, the actuators 132 for the binary valves 120, 122, 124 and 126 may be hydraulically, electrically or pneumatically powered actuators, or a combination thereof. In other applications, the binary valves 120, 122, 124 and 126 may comprise be mechanical actuator with a handle that can be actuated by another device or person, such as an ROV that can grasps and rotate the handle. The system 100 may be packaged in a variety of forms. For example, in one illustrative embodiment, the system 100 may be packaged as a stand-alone module, e.g., a pump module, a flow measurement module, etc., and it may be positioned where needed on an as-needed basis, or the module may be installed as a permanent part of an overall facility. In other applications, the system 100 may be incorporated as part of a larger system, module or manifold that may be movable as needed to a particular jobsite for use in performing a particular task, e.g., removal of a hydrate plug from a subsea flow line. Alternatively, the system 100 may be incorporated as part of a larger system, module or manifold that is permanently installed as part of an overall facility. The system 100 may be used in land-based or platform-based applications as well as in subsea applications. In one particular embodiment, all or a portion of the system 100 may be incorporated into an ROV skid that is coupled to an ROV. Thus, the particular inventions disclosed herein should not be considered to be limited to the particular form of the system 100 or how it may be packaged or configured for use in real-world applications.

Figure 3B:
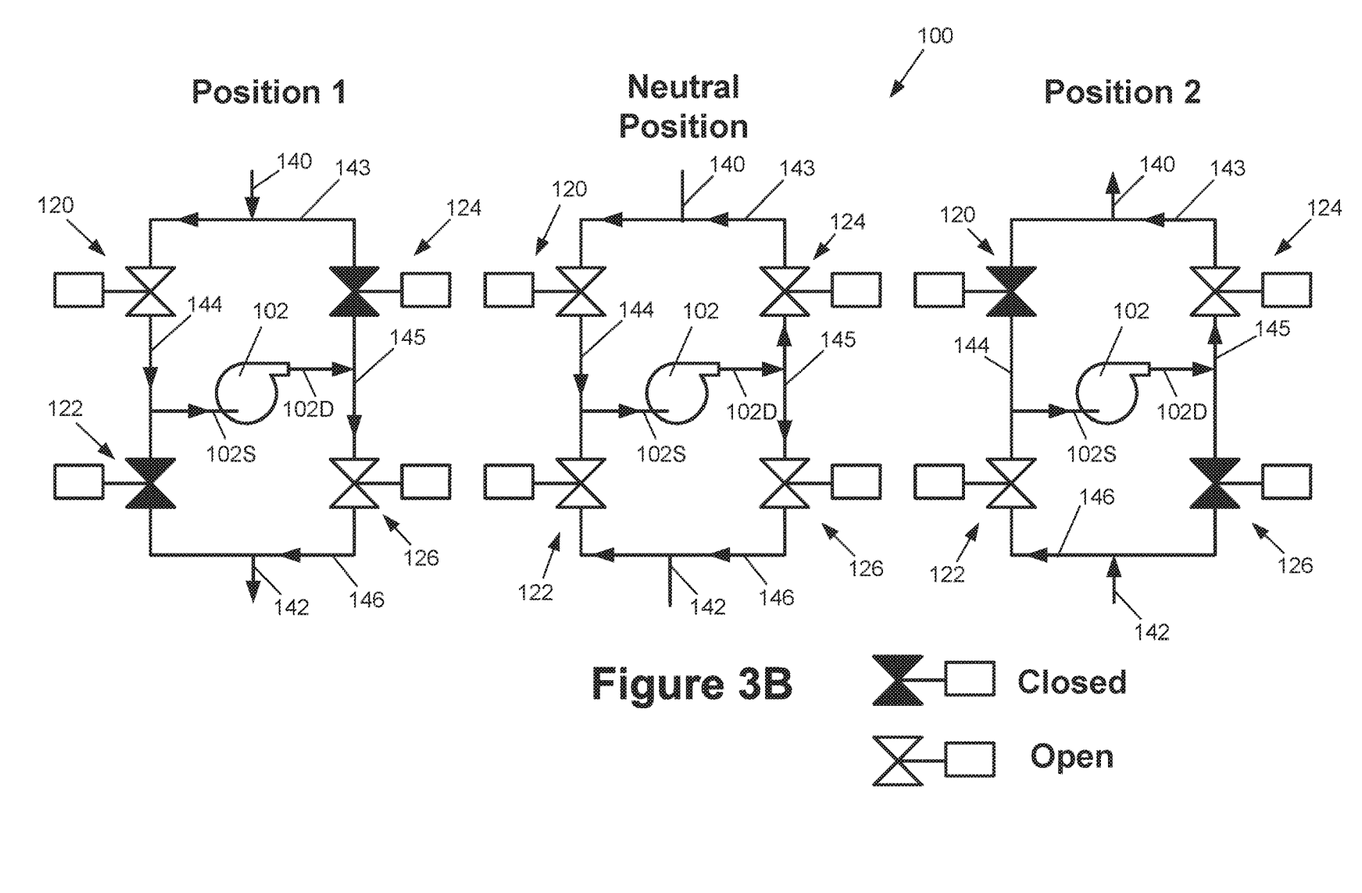
Figure 3C:
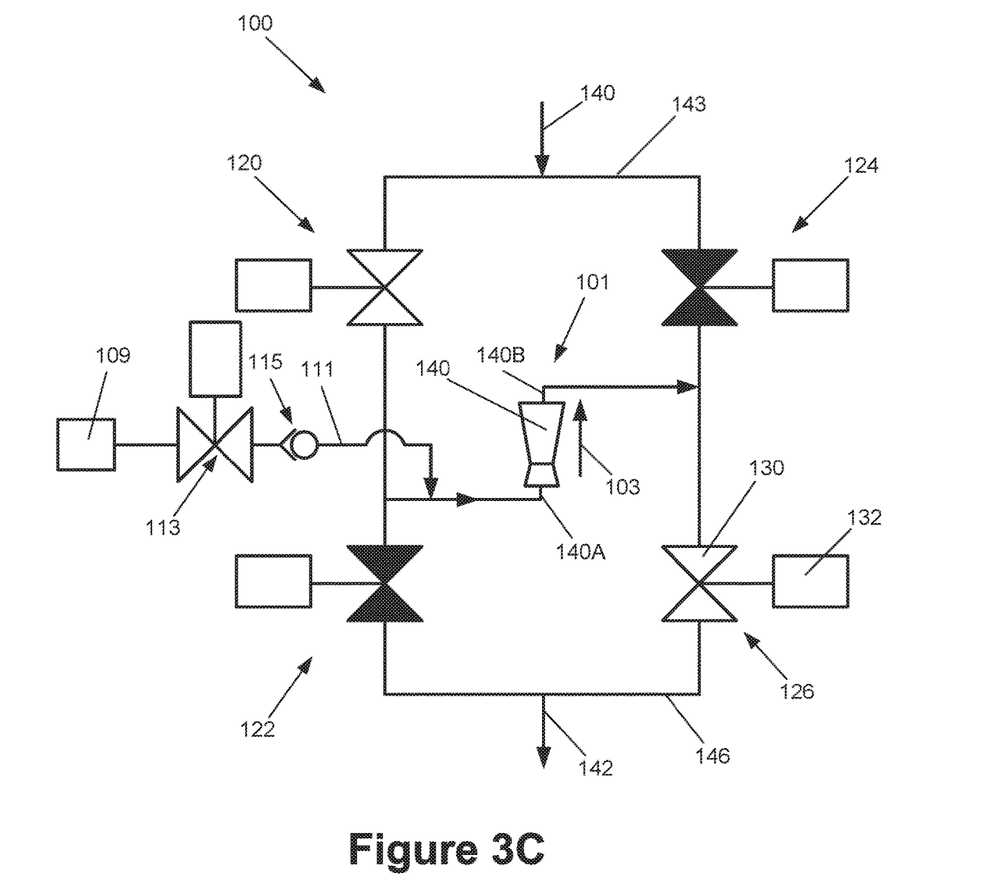
Figure 3D:
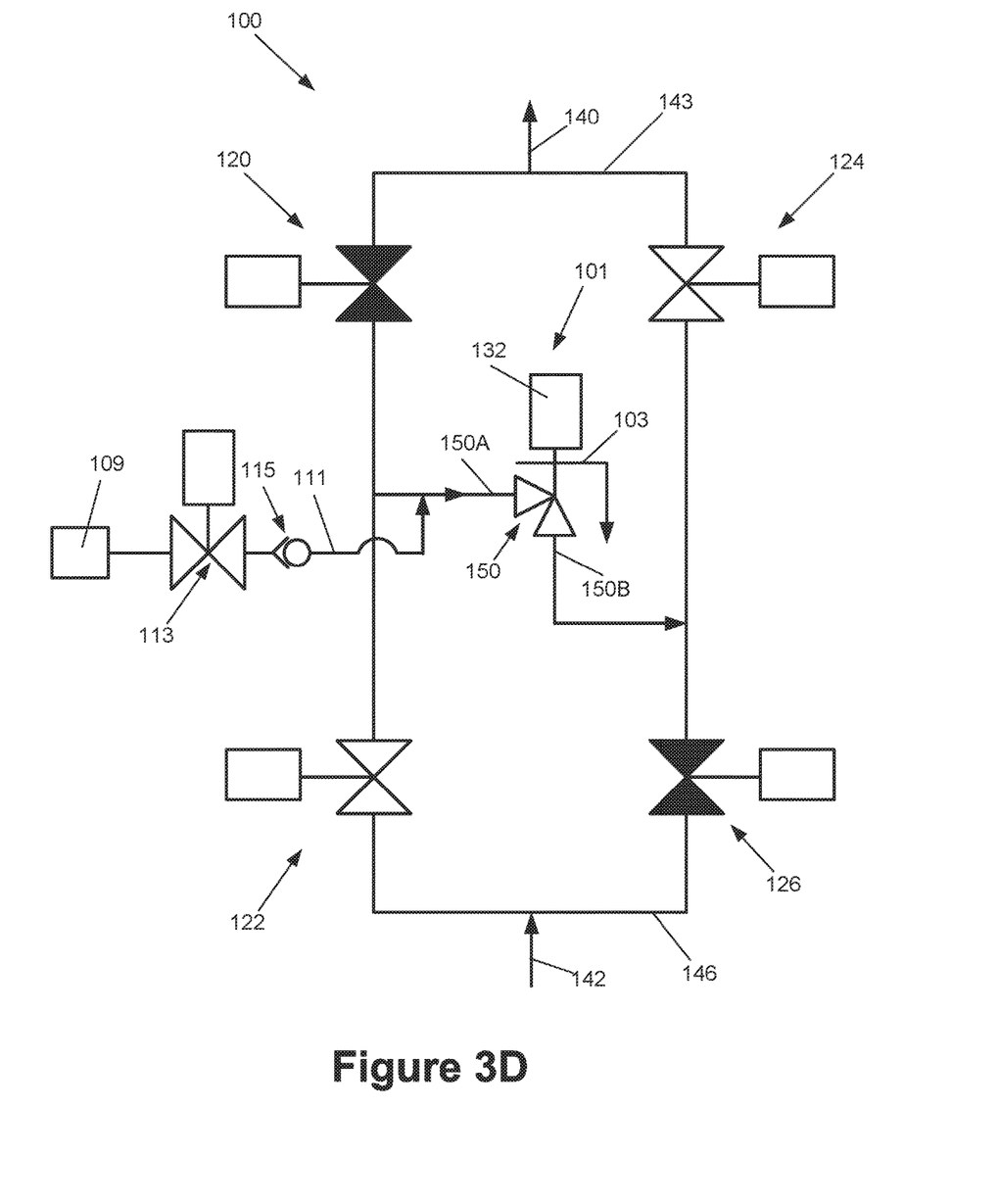

One illustrative operational sequence for the system 100 will now be discussed with reference to FIG. 3B, wherein the single direction flow device 101 is the illustrative positive displacement pump 102 mentioned above. In general, the binary valves 120, 122, 124 and 126 in the system 100 may be configured to be in a first position ("Position 1 configuration"), a Neutral Position configuration and a second position ("Position 2 configuration"). In the Position 1 configuration, the binary valves 120 and 126 are opened and the binary valves 122 and 124 are closed (as indicated by the blackened valve element). In the Position 1 configuration, the fluid that is introduced into the system 100, e.g., fluids and/or chemical from a surface vessel or reservoir, flows from the inlet 140 into the line 143 through the valve 120 and into line 144 so as to supply fluid to the suction side 102S of the pump 102. The higher pressure fluid leaving the pump discharge 102D flows into line 145 through the valve 126 into line 146 and leaves the system 100 via the outlet 142. It should be noted that the term "fluid" as used herein and in the attached claims includes any type of flow stream that includes any type of liquid component, e.g., a hydrocarbon containing liquid, water, a chemical, etc. In the Position 2 configuration, the binary valves 120 and 126 are closed and the binary valves 122 and 124 are opened. In the Position 2 configuration, the fluid is introduced into the system 100 via the inlet 142 where it flows into line 146 and through the valve 122 and into line 144 so as to supply fluid to the suction side 102S of the pump 102. The higher pressure fluid leaving the pump discharge 102D flows into line 145 through the valve 124 into line 143 and leaves the system 100 via the outlet 140.

In the Neutral Position configuration all of the binary valves 120, 122, 124 and 126 are opened and fluid is allowed to circulate freely within the system 100 around the pump 102. The system 100 is placed in the Neutral Position configuration so as to insure that there is no fluid lock and the pump 102 is not starved for fluid during the process of switching the system 100 from the Position 1 configuration to the Position 2 configuration and when switching they system 100 from the Position 2 configuration to the Position 1 configuration. The switching of the binary valves 120, 122, 124 and 126 may be synchronized so as to switch from the Position 1 configuration to the Neutral Position configuration to the Position 2 configuration. For example, starting from the Position 1 configuration, the closed binary valves 122 and 124 may be opened so as to configure the system 100 in the Neutral Position configuration wherein all of the binary valves 120, 122, 124 and 126 are open. After it has been confirmed that the binary valves 122 and 124 are fully opened, the binary valves 120 and 126 may be closed so as to configure the system 100 in the Position 2 configuration.

To move the system 100 from the Position 2 configuration to the Position 1 configuration, the process would essentially be reversed, i.e., the valves 120 and 126 would be opened to put the system 100 in the Neutral Position configuration and, after it is confirmed that the valves 120 and 126 are fully opened, the valves 122 and 124 would be closed so as to place the system in the Position 1 configuration. Stated broadly, the system 100 can be synchronized to: 1) have a first set of diagonally positioned valves open together (while a second set of diagonally positioned valves remain closed); 2) opening the closed second set of valves to a fully open position, and 3) closing the first set of valves after the second set of valves have fully opened. There may or may not be any fluid flow in the lines 140/142 when the system 100 is in the Neutral Position shown in FIG. 3B.

In general, the first 120, second 122, third 124 and fourth 126 binary valves are in fluid communication with the single direction flow device 101 and, collectively, the first 120, second 122, third 124 and fourth 126 binary valves are adapted to be actuated so as to regulate the direction of a flow of the fluid to and from the overall system 100 while insuring that the fluid flows through the single direction flow device 101 in the direction 103. More specifically, the system 100 may be configured in a First Position wherein the first 120 and fourth 126 binary valves are open and the second 122 and third 124 binary valves are closed, the fluid flows through the single direction flow device 101 in the first direction 103 and the fluid enters the system 100 via the first inlet/outlet line 140 flows and leaves the system via the second inlet/outlet line 142. The system 100 is also adapted to be configured from the First Position to the Neutral Position by actuating the second 122 and third 124 binary valves from a closed position to an open position wherein, in the Neutral Position, the first 120, second 122, third 124 and fourth 126 binary valves are open and the fluid flows through the single direction flow device 101 in the first direction 103. The system is also adapted to be further configured from the Neutral Position to the Second Position by actuating the first 120 and fourth 126 binary valves from an open position to a closed position wherein, in the Second Position, the first 120 and fourth 126 binary valves are closed and the second 122 and third 124 binary valves are opened and the fluid enters the system via the second inlet/outlet line 142 flows through the single direction flow device 101 in the first direction 103 and leaves the system via the first inlet/outlet line 140. That is, the direction of the flow of the fluid through the overall system 100 is reversed when it is in its Position 2 configuration as compared to the direction of fluid flow through the system 100 when it is in its Position 1 configuration, but in both the Position 1 and the Position 2 configurations, the certain of the valves are actuated (opened/closed) such that the direction of fluid flow through the single direction flow device 101 is always in the first direction 103

Figure 3E:
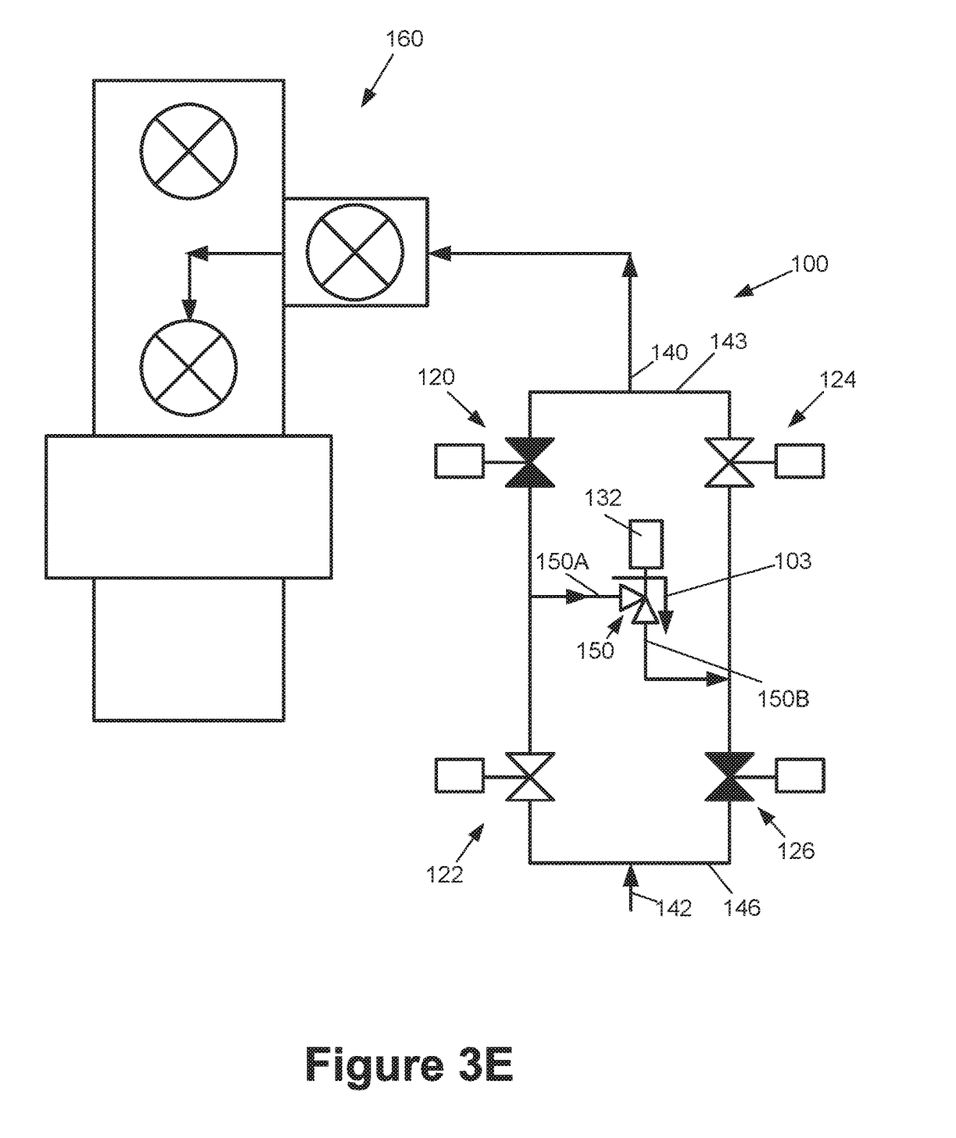
Figure 3F:
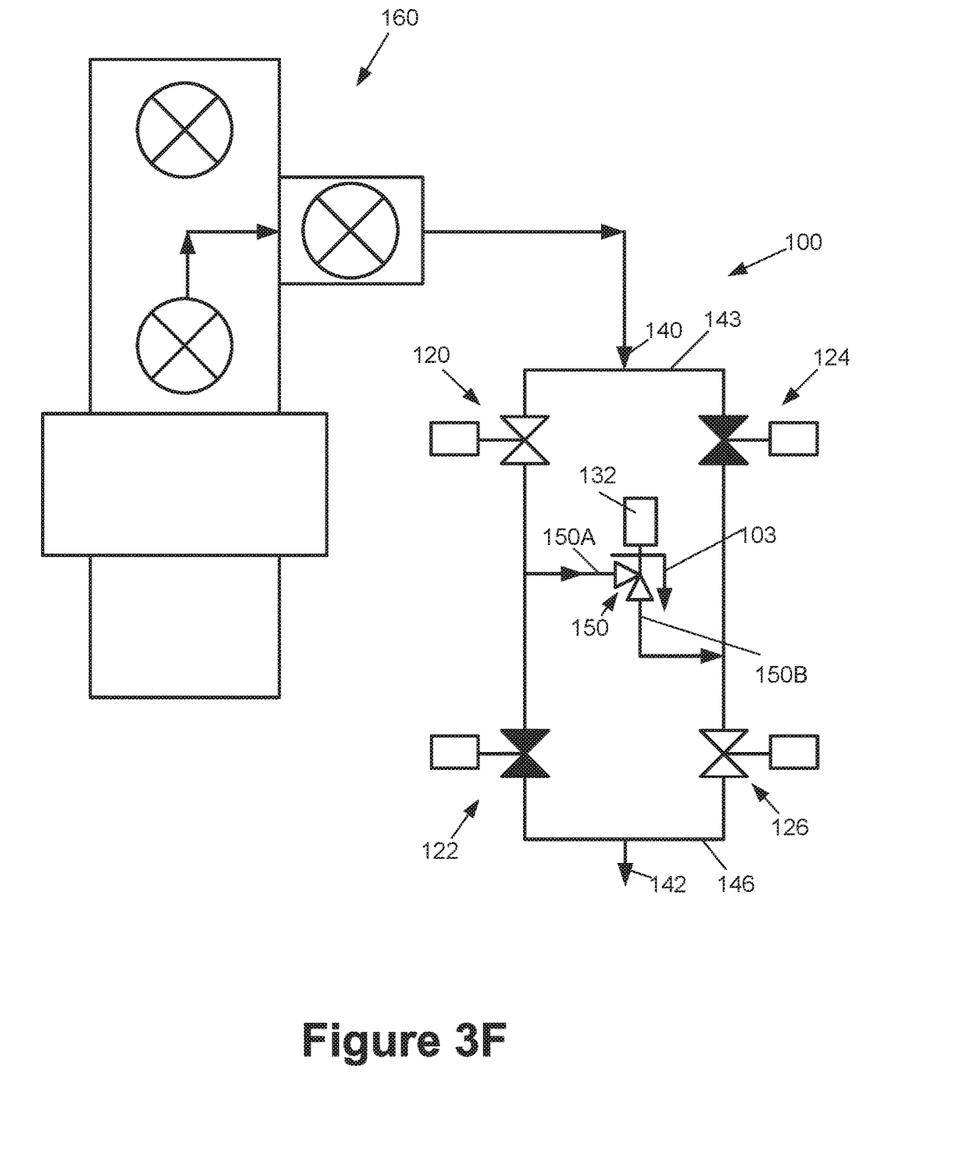

FIGS. 3E-3F depict other illustrative applications of an embodiment of the system 100 wherein the single direction flow device 101 is an adjustable choke 150 with an actuator 132 and wherein the system 100 is operatively coupled to an illustrative and simplistically depicted subsea tree 160 for an oil/gas well. In the configuration depicted in FIG. 3E, the system 100 is configured (valves 120 and 126 closed; valves 122 and 124 open) such that a fluid may be injected into the tree 160. In the configuration depicted in FIG. 3F, the system 100 is configured (valves 120 and 126 open; valves 122 and 124 closed) such that a fluid may be produced from the tree 160 through the system 100 wherein the choke 150 is used to regulate the flow of production fluid from the tree 160.

Figure 3G:
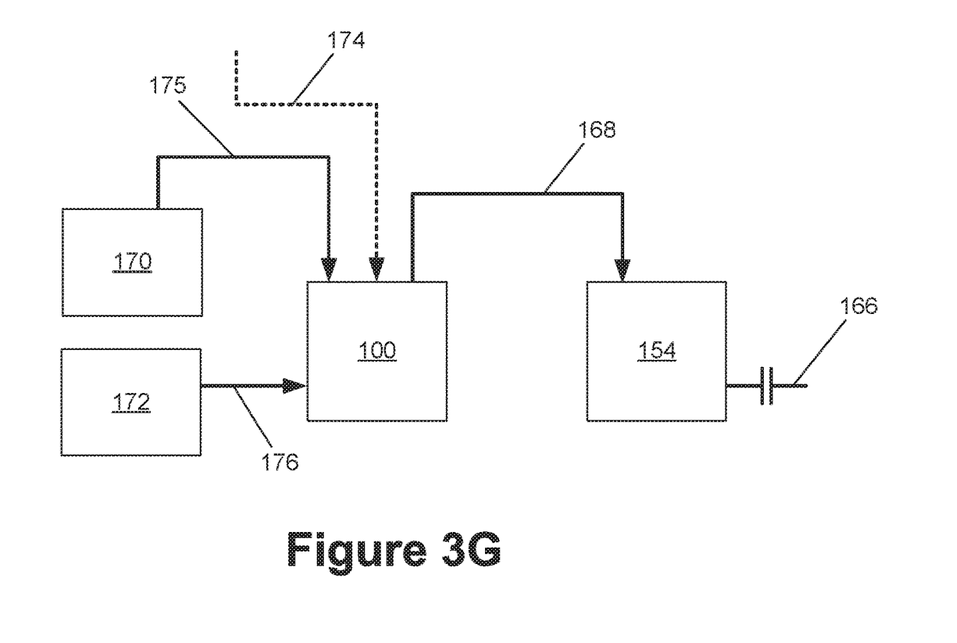

FIG. 3G depicts an embodiment of the system 100 where the system 100 is packaged a module, e.g., a pump module that is positioned subsea and coupled to an isolation valve module 154 that contains a safety valve. The isolation valve module 154 is operatively coupled to a flow line or item of equipment (as generically indicated by the reference number 166) where the system 100 may be employed to perform some type of operation of the flow line or item of equipment 166, such as remove a hydrate plug, inject chemicals or fluids, etc. In this embodiment, the system 100 may be adapted to operate with depth (i.e., pressure) compensated bladder type containers 170 and/or 172 so as to eliminate relatively long downlines 174 (depicted in a dashed line) that would normally extend from a surface vessel to a prior art pump module as disclosed in the background section of this application. In this embodiment, the bladder type containers rely of the hydrostatic head of the water to supply the necessary pressure so that fluid in the containers 170 and/or 172 may be supplied to the system 100. In one illustrative embodiment, the bladder type container 170 may include a chemical solution that may be injected into the flow line or item of equipment 166 via line 175 while the bladder type container 172 may contain ethanol that can be introduced into the system 100 via line 176. By using the bladder type containers 170 and/or 172 the hydraulic pressure losses associated with long downlines 174 may be avoided. Moreover the problem with deep water ambient pressure limiting fluid delivery pressure to a subsea well of flowline may also be avoided.

As will be appreciated by those skilled in the art after a complete reading of the present application, the novel systems 100 disclosed herein provide the operator of the system 100 with great flexibility and several options for an assortment of single direction flow devices 101 that may be enhanced by reversed flow operations. For example, the system 100 may be used to avoid shutting off fluid flow to the single direction flow device 101, e.g., the pump 102 prior to moving inlet and outlet piping so as to achieve the desired reversal of flow directions before starting the pump 102 in the new system configuration. Alternating the direction of fluid flow to and from the system 100 may be simply done by the switching the binary valves 120, 122, 124 and 126 within the pump module assembly as described above. Thus, the system disclosed herein may simplify the connection of conduits into various modules, supply line connections and delivery connections. Moreover, using the systems disclosed herein, these lines and connections may only have to be connected and pressure tested once. The novel systems disclosed herein may be employed in various applications. In the case where the system 100 comprises that pump 102, the system 100 (e.g., pump module) may be used for multiple offshore jobs, acid stimulation/chemical injection, and flowline remediation. The unique combination and positioning of the binary valves 120, 122, 124 and 126, the single direction flow devices 101 and operational switching capabilities of the system 100 makes the pump module more mission-flexible for multiple uses thereby saving hardware asset costs.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below

The invention claimed is:

1. A flow reversal system, comprising:
   a single direction flow device adapted for receiving a fluid, wherein the single direction flow device is one of a flow meter, a metering valve, or a choke; and
   first, second, third and fourth binary valves that are in fluid communication with the single direction flow device wherein, collectively, the first, second, third and fourth binary valves are adapted to be actuated so as to regulate the direction of a flow of the fluid to and from the single direction flow device, wherein said system is adapted to:
      be configured in a first position wherein the first and fourth binary valves are open and the second and third binary valves are closed and the fluid flows through the single direction flow device in a first direction;
      be configured from the first position to a neutral position by actuating the second and third binary valves from a closed position to an open position wherein, in the neutral position, the first, second, third and fourth binary valves are open and the fluid flows through the single direction flow device in the first direction;
      be configured from the neutral position to a second position by actuating the first and fourth binary valves from an open position to a closed position wherein, in the second position, the first and fourth binary valves are closed and the second and third binary valves are opened and the fluid flows through the single direction flow device in the first direction.

2. The system of claim 1, further comprising:
   a first inlet/outlet line in fluid communication with the single direction flow device; and
   a second inlet/outlet line in fluid communication with the single direction flow device, wherein when the system is configured in the first position the fluid enters the system via the first inlet/outlet line flows through the single direction flow device in the first direction and leaves the system via the second inlet/outlet line and wherein when the system is configured in the second position the fluid enters the system via the second inlet/outlet line flows through the single direction flow device in the first direction and leaves the system via the first inlet/outlet line.

3. The system of claim 1, wherein the first, second, third and fourth binary valves comprise at least one of a gate valve or a ball valve.

4. The system of claim 1, wherein the first, second, third and fourth binary valves are each a gate valve.

5. The system of claim 1, wherein the first, second, third and fourth binary valves comprise at least one of a hydraulically powered actuator, a pneumatically powered actuator, an electrically powered actuator or a mechanical actuator.

6. The system of claim 1, wherein the first and second binary valves are adapted to regulate the direction of the flow of the fluid to an inlet of the single direction flow device and the third and fourth binary valves are adapted to regulate the direction of the flow of the fluid from an outlet of the single direction flow device.

7. The system of claim 1, further comprising a source of methanol that is in fluid communication with an inlet of the single direction flow device.

8. The system of claim 1, wherein the system is adapted to be operatively coupled to a subsea tree positioned above an oil/gas well and wherein the first, second, third and fourth binary valves are adapted to be configured such that the fluid flowing in the first direction through the single direction flow device is injected into the subsea tree.

9. The system of claim 8, wherein the single direction flow device is the choke, said choke being an adjustable choke.

10. The system of claim 8, wherein, by actuation of only two of the first, second, third and fourth binary valves, the first, second, third and fourth binary valves are configured such that the fluid flowing from the subsea tree flows through the single direction flow device in the first direction.

11. The system of claim 1, further comprising at least one bladder type container that is in fluid communication with the system, wherein a fluid in the at least one bladder type container is adapted to be injected into the system at a point that is on an inlet side of the single direction flow device.

12. The system of claim 1, wherein the single flow direction device is the flow meter.

13. A flow reversal system, comprising:
a single direction flow device adapted for receiving a fluid, wherein the single direction flow device is one of a flow meter, a metering valve, or a choke;
a first inlet/outlet line in fluid communication with the single direction flow device;
a second inlet/outlet line in fluid communication with the single direction flow device; and
first, second, third and fourth binary valves that are in fluid communication with the single direction flow device wherein the first and second binary valves are adapted to regulate the direction of the flow of the fluid to an inlet of the single direction flow device and the third and fourth binary valves are adapted to regulate the direction of the flow of the fluid from an outlet of the single direction flow device, wherein the system is adapted to:

be configured in a first position wherein the first and fourth binary valves are open and the second and third binary valves are closed and the fluid enters the system via the first inlet/outlet line, the fluid flows through the single direction flow device in a first direction and the fluid exits the system via the second inlet/outlet line;

be configured from the first position to a neutral position by actuating the second and third binary valves from a closed position to an open position wherein, in the neutral position, the first, second, third and fourth binary valves are open and the fluid flows through the single direction flow device in the first direction;

be configured from the neutral position to a second position by actuating the first and fourth binary valves from an open position to a closed position wherein, in the second position, the first and fourth binary valves are closed and the second and third binary valves are opened and the fluid enters the system via the second inlet/outlet line and the fluid flows through the single direction flow device in the first direction and the fluid exits the system via the first inlet/outlet line.

14. The system of claim 13, wherein the first, second, third and fourth binary valves comprise at least one of a gate valve or a ball valve.

15. The system of claim 14, wherein the first, second, third and fourth binary valves comprise at least one of a hydraulically powered actuator, a pneumatically powered actuator, an electrically powered actuator or a mechanical actuator.

16. The system of claim 13, further comprising a source of methanol that is in fluid communication with an inlet of the single direction flow device.

17. The system of claim 13, wherein the system is adapted to be operatively coupled to a subsea tree positioned above an oil/gas well and wherein the first, second, third and fourth binary valves are adapted to be configured such that the fluid flowing in the first direction through the single direction flow device is injected into the subsea tree.

18. The system of claim 17, wherein the single direction flow device is the choke, said choke being an adjustable choke.

19. The system of claim 18, wherein, by actuation of only two of the first, second, third and fourth binary valves, the first, second, third and fourth binary valves are configured such that the fluid flowing from the subsea tree flows through the single direction flow device in the first direction.

20. The system of claim 13, further comprising at least one bladder type container that is in fluid communication with the system, wherein a fluid in the at least one bladder type container is adapted to be injected into the system at a point that is on an inlet side of the single direction flow device.

21. The system of claim 13, wherein the single flow direction device is the flow meter.

* * * * *